United States Patent [19]
Hesse

[11] Patent Number: 6,042,171
[45] Date of Patent: Mar. 28, 2000

[54] DEFLECTOR FOR MOTORCYCLE

[76] Inventor: Walter T. Hesse, 4815 Plummers Point Rd., Oshkosh, Wis. 54904

[21] Appl. No.: 08/947,125

[22] Filed: Oct. 8, 1997

Related U.S. Application Data

[63] Continuation-in-part of application No. 08/578,172, Dec. 29, 1995, abandoned.

[51] Int. Cl.⁷ .................................................... B62J 17/06
[52] U.S. Cl. ............................................................ 296/78.1
[58] Field of Search .................................. 296/77.1, 78.1, 296/82; 180/68.1; 280/152.1–152.3; D12/181–186

[56] References Cited

U.S. PATENT DOCUMENTS

D. 248,940   8/1978   Saunders, IV .......................... D12/182

FOREIGN PATENT DOCUMENTS

| | | | |
|---|---|---|---|
| 186150 | 9/1955 | Anguilla ................................ | 296/78.1 |
| 545671 | 6/1932 | Germany ............................... | 296/78.1 |
| 27 26 2448 | 12/1978 | Germany . | |
| 2726244 | 12/1978 | Germany ............................... | 296/78.1 |
| 158051 | 2/1921 | United Kingdom ................... | 296/78.1 |
| 278535 | 10/1927 | United Kingdom ................... | 296/78.1 |

*Primary Examiner*—Dennis H. Pedder
*Attorney, Agent, or Firm*—R. Jonathan Peters

[57] ABSTRACT

The invention provides a pair of deflectors symmetrically mounted on each side of a motorcycle. Each pair of deflectors, being substantially identical, is mounted on the longitudinal center axis of the front fork of the motorcycle, and comprises a first panel and second panel separately and fixedly mounted to the motorcycle and partially in spaced, overlapping disposition. The first panel is obliquely angled as viewed in cross-section thereby forming an upper section, and a bottom section extending downwardly and rearwardly with reference to the fork. The second panel is disposed mainly rearwardly relative to the first panel, and terminates at its forward or leading edge with an angled or curved upper surface, as viewed in cross-section, which overlaps in spaced disposition with the bottom section of the first panel. The panels, and the unique arrangement thereof, direct air away from the rider.

12 Claims, 6 Drawing Sheets

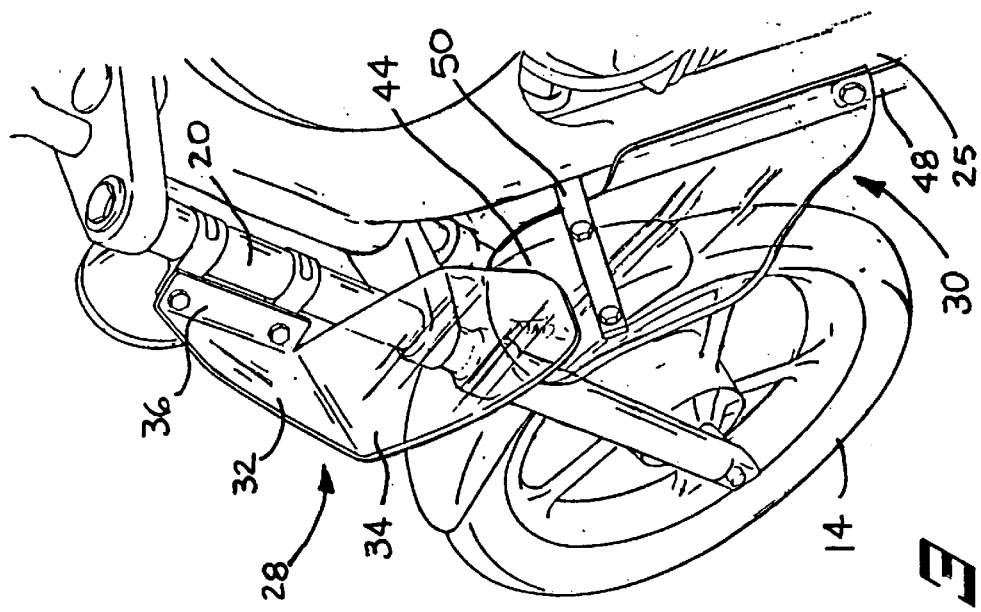
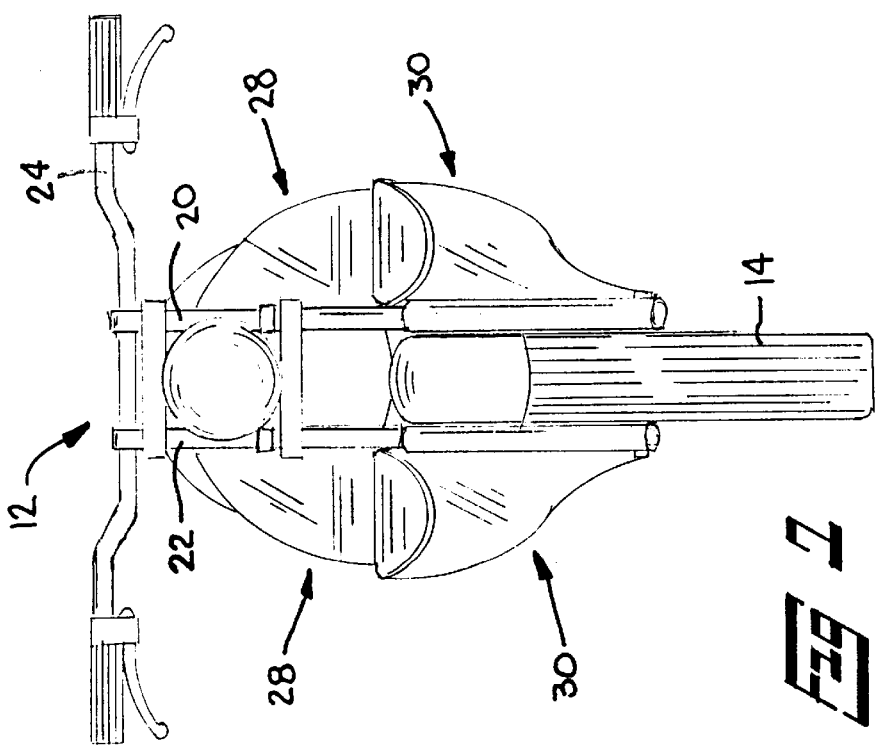

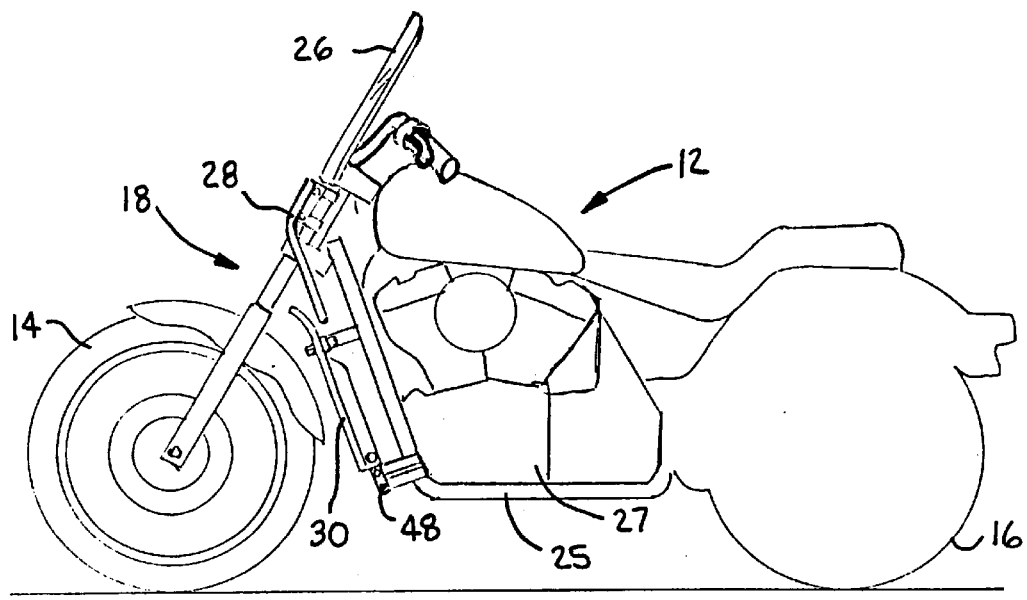
_FIG 2_
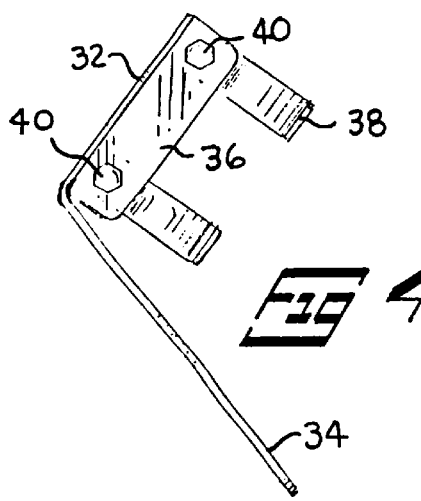
_FIG 4_
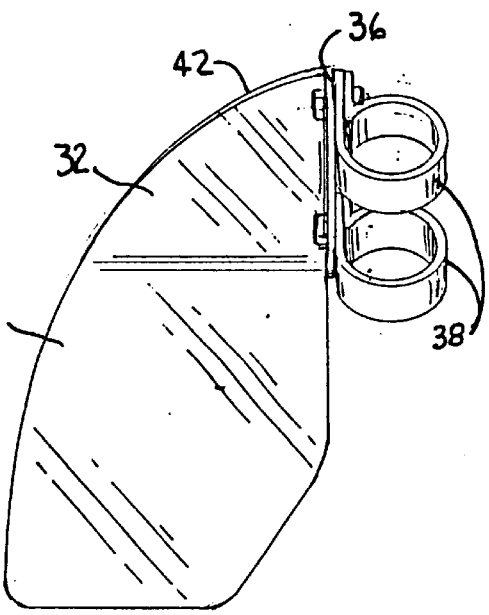
_FIG 5_
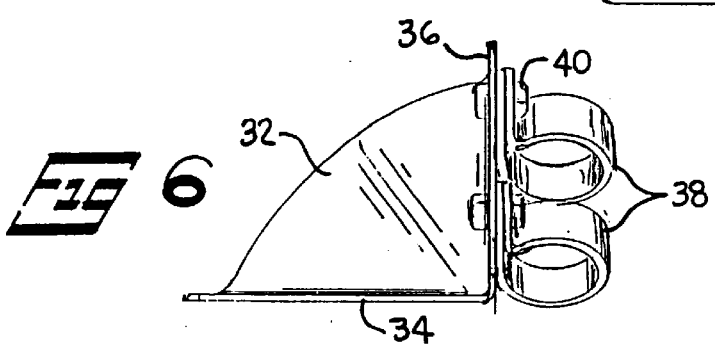
_FIG 6_

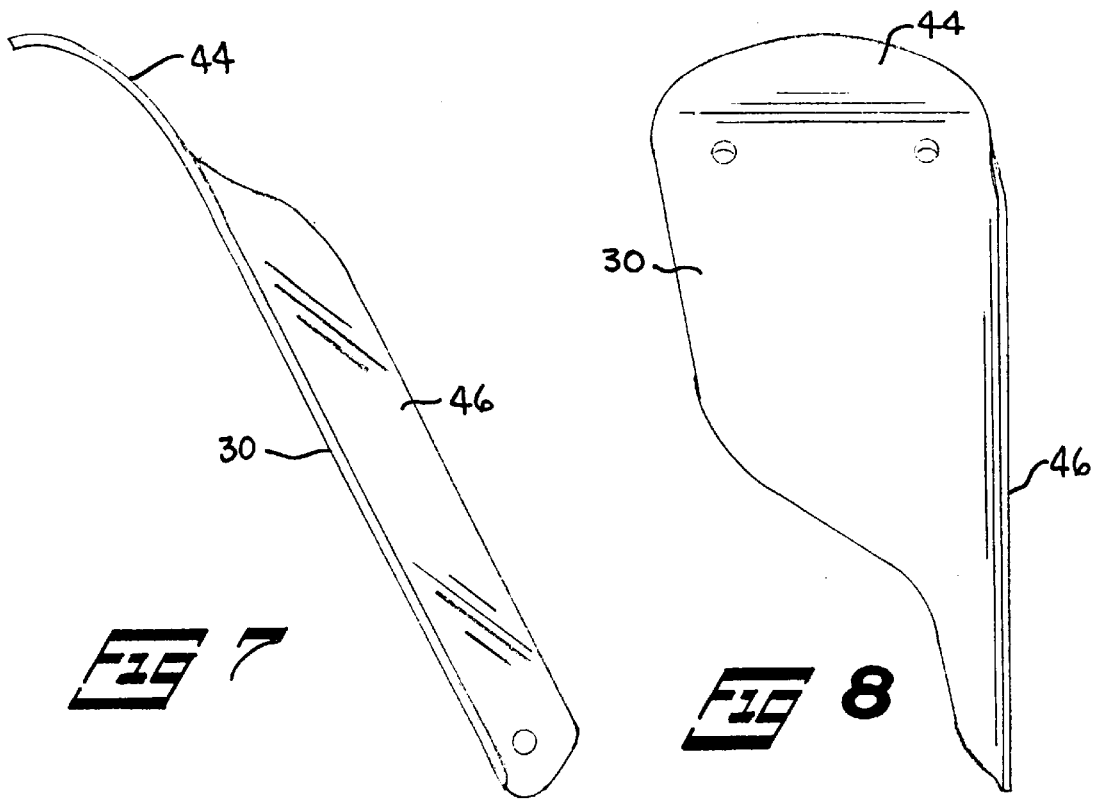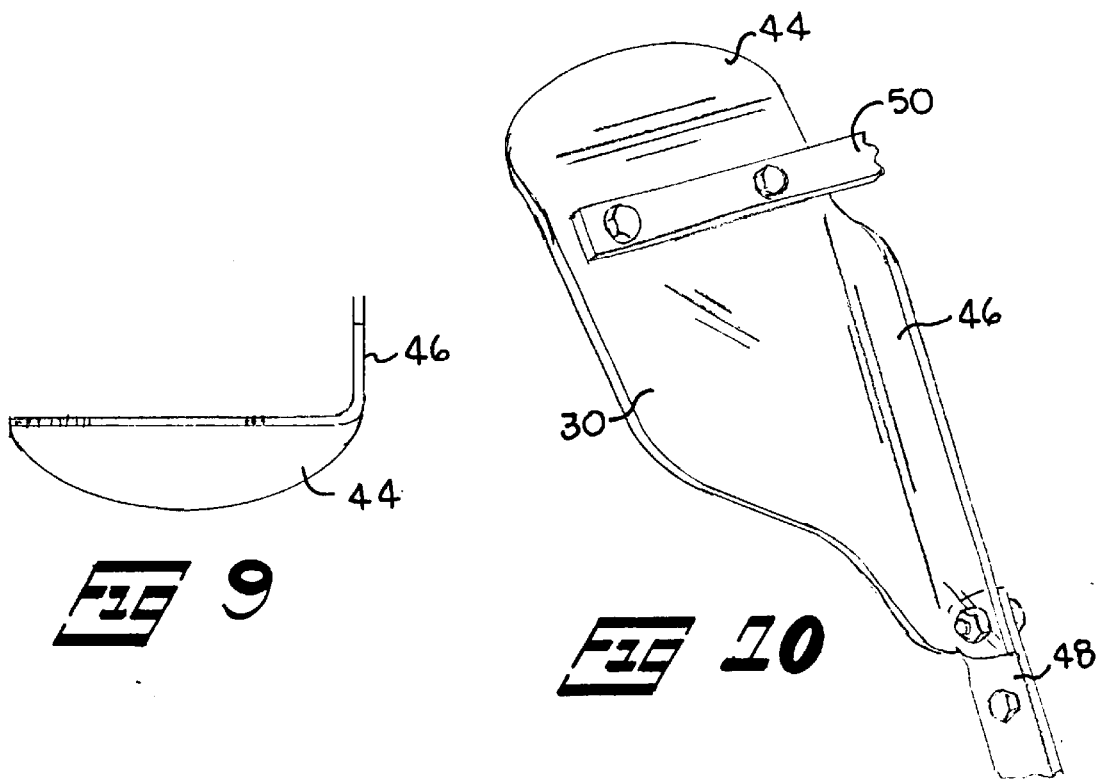

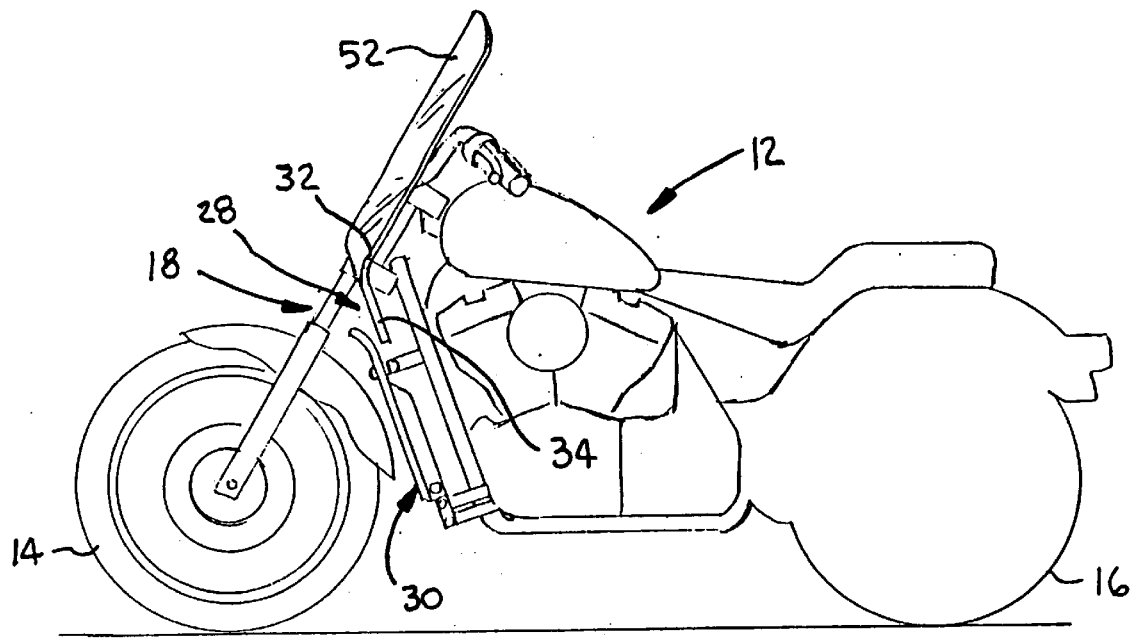
FIG 11
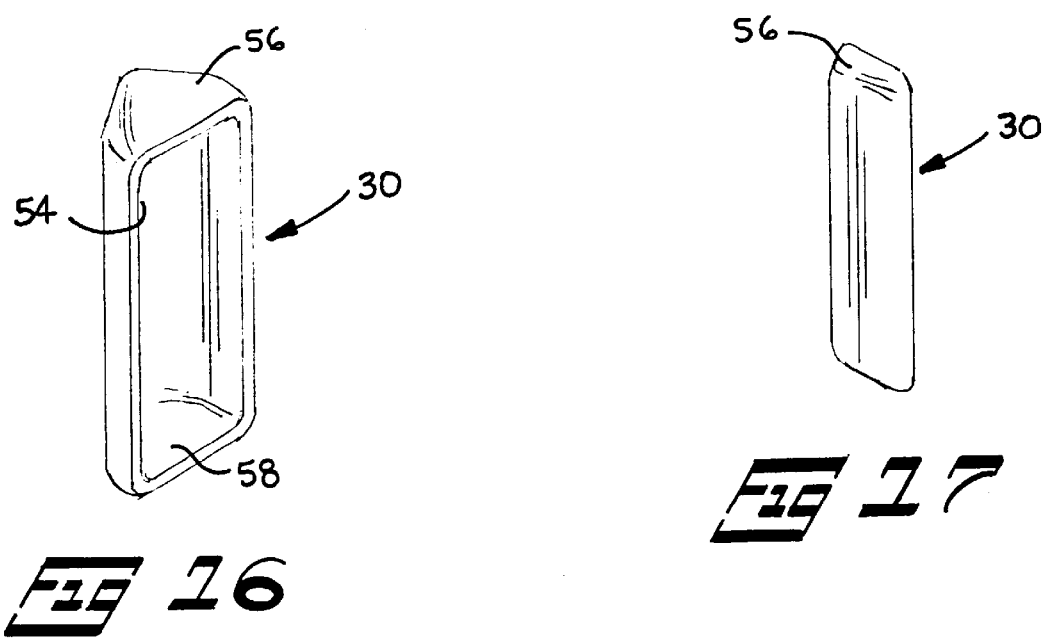
FIG 16
FIG 17

DEFLECTOR FOR MOTORCYCLE

This application is a continuation-in-part of U.S. Ser. No. 08/578,172, filed on Dec. 29, 1995, now abondoned.

FIELD OF THE INVENTION

This invention relates to a deflector for a motorcycle. In its more specific aspect, this invention relates to a deflector for a motorcycle for substantially reducing the flow of air against the rider, that is, to protect the rider against wind pressure, especially when operating at high speeds.

BACKGROUND AND PRIOR ART

Motorcycles, especially for touring or commuting, have been provided with various designs of shields, deflectors, or fairings to protect the rider or cyclist against the wind, water, dirt, and insects. Also, the engine is mounted midway on the frame of the motorcycle, and because it is exposed, heat from the engine can provide some discomfort to the rider. Therefore, in some instances, a shield or deflector has been designed to direct air toward or across the engine to provide a cooling effect. In addition, there is the tiring effect of fighting the flow of air on the part of the rider, particularly when traveling at high speeds. Thus, the general purpose of these shields or deflectors has been to provide added comfort and safety for the rider.

Generally, the shields or deflectors in use or proposed in the prior art are relatively expensive and/or tend to be heavy, or bulky, and furthermore can be hazardous. Some shields are attached to the handlebars of the bike, or close to them, and therefore tend to interfere with seeing and steering. A windshield, per se, mounted on the handlebars of a motorcycle, are a somewhat common add-on, which help to protect the rider's face from the wind. Even with a windshield, however, there is a strong underscreen turbulence.

For example, in U.S. Pat. No. 4,130,315, there is shown a fairing comprised of a first section extending the breadth of the handlebars, a second section (windshield) extending above the handlebars for shielding the rider's face, and a third section extending downwardly on opposite sides of the front fork. The bottom section is provided with vents for directing cooling air toward the motorcycle engine and the cyclist.

A cowling assembly or fairing utilizing a windshield in combination with air inlets and outlets is also disclosed in U.S. Pat. No. 4,911,494. Air is directed upwardly and away from the riders head.

An air cooling shield for motorcycles is disclosed in U.S. Pat. No. 1,412,634. Two or more shields are attached to both sides of the motorcycle, and are inclined downwardly and so arranged that the forward edge of the first shield is positioned at a lower level than the forward edge of the second shield. The shields direct air onto the cylinders thereby providing a cooling effect. U.S. Pat. No. 4,136,890 discloses a pair of leg shields mounted on each side of the crash bar of a motorcycle. Each shield is generally planar but curved convexly at the top and outer side to provide a lifting force to the shield.

German patent application P27262448, published Dec. 12, 1978, to Kreidler, discloses a motorcycle fairing consisting of an upper cover 1 (having a depending segment from the windshield that lies essentially in a horizontal plane parallel with the longitudinal axis of the bike) and leg cover 5 (which is essentially horizontally disposed and parallel with the longitudinal axis of the bike). The steering cover and leg cover overlap at 6 and 8, thereby forming a small air column. The planar surfaces of covers 6 and 8 that form this overlap, however, lie in a vertical plane and extend essentially parallel with the longitudinal axis of the bike. Further the two overlapping sections are concentrically arranged, and are concentric to the axis of the fork, so that upon turning, section 6 turns within the arc of section 8. This cover arrangement appears to be unduly large, and the foot peg is restricted to a rearward positon.

The shields or fairings disclosed in the prior art are cumbersome, or expensive, or have a high vertical dimension that can interfere with seeing or steering, such as a conventional type windshield used in combination with deflectors or air vents to provide a cooling effect or to protect the rider against wind, water, dirt, etc.

This present invention has, therefore, as its purpose to provide a deflector to protect the rider against wind pressure that overcomes many of the disadvantages of the prior art.

It is another object of the invention to provide a deflector for substantially reducing the flow of air against the rider so as to overcome its tiring effect especially at high speeds.

It is yet another object of the invention to provide such a deflector for use in combination with a conventional type windshield to substantially reduce or eliminate underscreen turbulence.

It is another object of the present invention to provide such a deflector that is relatively inexpensive, aesthetically pleasing, and simple to mount.

It is still a further object of the present invention to provide such a deflector that will enhance the comfort and safety of the rider.

SUMMARY OF THE INVENTION

Broadly, the invention provides for a deflector symmetrically mounted on each side of a motorcycle as viewed from the front, that is, symmetrically mounted with reference to the longitudinal axis of the front fork of the bike. A motorcycle typically has a front fork with longitudinally spaced apart fork members, and a front steerable wheel is rotatably mounted on the fork. The deflector comprises first and second panel members, and each member of the pair, being substantially identical, is mounted on the longitudinal center axis of the fork, and, when mounted, are the mirror image of each other. Thus, each member of the pair of deflectors comprises a first panel and a second panel mounted to the motorcycle so that the planar surface of each is substantially transverse to the longitudinal axis of the fork and partially in spaced, overlapping disposition. The first panel of each pair is obliquely angled (preferably at an obtuse angle) as viewed in elevational cross-section thereby forming an upper section, which is disposed substantially parallel to the front fork of the motorcycle or at an oblique angle forward of the fork, and a bottom section extending downwardly and rearwardly with reference to the longitudinal axis of the fork. The bottom section includes a trailing or rearward edge for disposition substantially transverse to the longitudinal axis of the front fork. It should be understood that such terms used herein and in the appended claims as being "substantially parallel" and "substantially transverse" are not intended to be restricted to the literal meaning, but can be slightly angled. The second panel of each pair (that is the planar surface of each) is disposed substantially transverse to the longitudinal axis of the fork and mainly downwardly and slightly rearwardly relative to the first panel. The second panel terminates at its forward or leading edge with an inclined upper surface in profile (e.g., arcuately curved or angled upper surface, as viewed in cross-section), which overlaps in spaced disposition with the bottom section of the first panel. That is, when the panels are mounted, the leading edge or forward edge of the second panel is positioned ahead of and at a higher level than the rearward edge or trailing edge of the bottom section of the first panel. The panels, and the unique arrangement thereof, protect the rider against wind pressure, and direct air away from the rider, as will be more apparent from the detailed description below. Upon steering, the trailing edge of the bottom section of the first panel passes over and above the leading edge of the second panel and remains substantially transverse to the longitudinal axis of the fork.

In a preferred embodiment of my invention, the deflector is used in combination with a conventional or standard windshield mounted on the handlebars of the motorcycle. The first panel is substantially planar, and includes an upper section and a bottom section obliquely angled relative to the plane of the upper section. The upper section, which may include an outwardly disposed angled or arcuate marginal edge, is desirably co-operably engagable with the fork of the motorcycle for disposition angled forward of the fork or substantially parallel thereto. Thus, when the upper section is mounted or engaged with the fork, the obliquely angled bottom section thereby extends diagonally downwardly and rearwardly relative to the fork of the motorcycle. The second panel has a substantially planar surface for disposition mainly downwardly and rearwardly relative to the first panel, and has an angled or a convex profile at its upper surface for overlapping disposition with the bottom section of the first panel and spaced forward thereof thereby forming an air passageway for directing air downwardly and away from the rider and across the engine.

The pairs of deflectors are essentially identical, and are mounted symmetrically on the front fork members and frame of the motorcycle. In a preferred embodiment of the invention, the pair of second panels are interconnected by any suitable means such as a bracket extending laterally between the two and affixed to each. Also, suitable means are provided for fixedly mounting the second panel to the motorcycle, such as the frame, for substantially parallel disposition relative to the plane of the bottom section of the first panel. Thus, the two panels are securely mounted to the motorcycle, but are not obtrusive or cumbersome so as to interfere with steering or the rider's movements. Where desired, and as shown in an alternative embodiment, the first panel may be formed integrally with the windshield.

BRIEF DESCRIPTION OF THE DRAWINGS

FIG. 1 is a front elevational view of a conventional motorcycle having mounted thereon the deflector of the present invention.

FIG. 2 is a side elevational view of the motorcycle of FIG. 1 with the deflector mounted thereon.

FIG. 3 is a fragmentary perspective view of the motorcycle of FIG. 1.

FIG. 4 is side elevational view of the first or upper panel member of the deflector as viewed in a mounting position.

FIG. 5 is a front elevational view of the upper panel as shown in FIG. 4.

FIG. 6 is an end view of the upper panel shown in FIG. 4.

FIG. 7 is side elevational view of the second or lower panel member of the deflector as viewed in a mounting position.

FIG. 8 is a front elevational view of the lower panel as shown in FIG. 7.

FIG. 9 is an end view of the lower panel shown in FIG. 7.

FIG. 10 is a perspective view of the lower panel shown in FIG. 7 with suitable mounting means.

FIG. 11 is a side elevational view of a motorcycle showing an alternative embodiment of the invention wherein the upper panel is formed integrally with the windshield.

FIG. 16 is a perspective view of an alternative embodiment of the lower or second panel of the deflector modified to serve as a container or encasement.

FIG. 17 is a side view of the panel of FIG. 16.

DETAILED DESCRIPTION OF THE INVENTION

Figure 13:
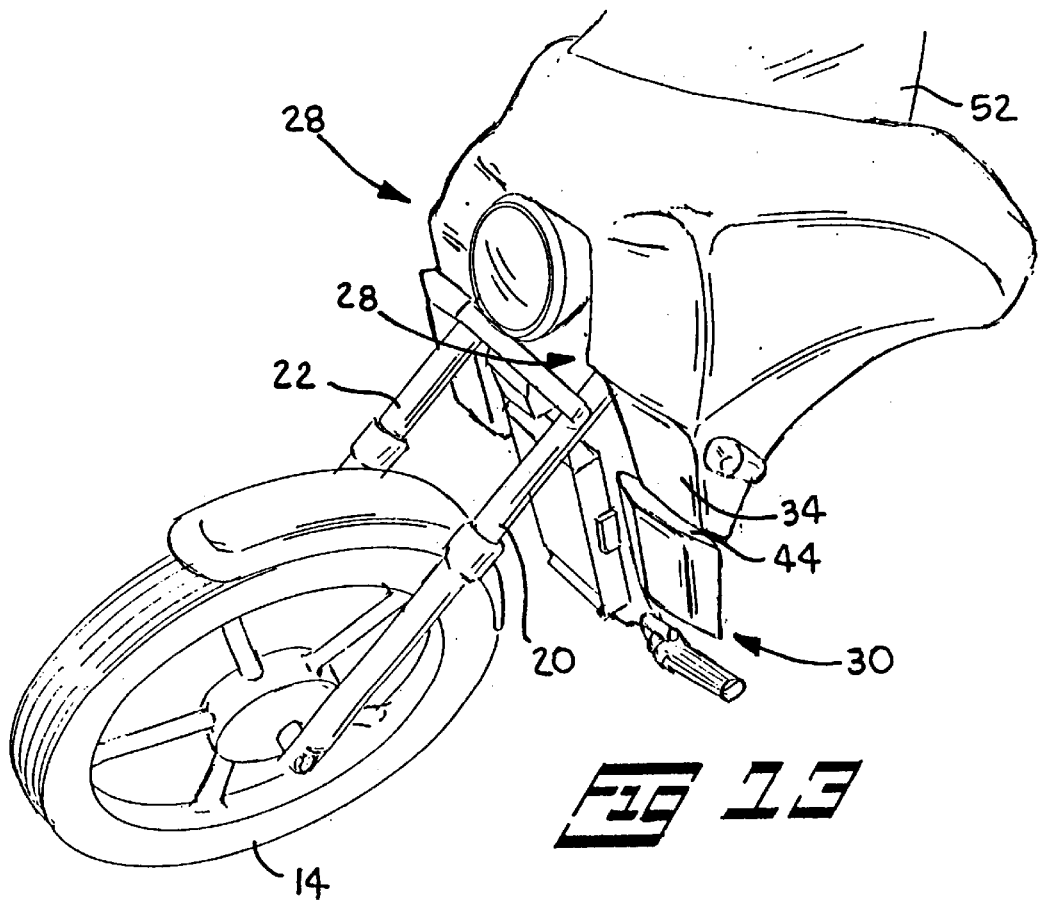
FIG. 13 is a perspective view of the motorcycle of FIG. 12 as viewed slightly from the top.

Referring to the drawings wherein like reference numerals refer to similar parts throughout the various views, there is shown in FIGS. 1–3 a motorcycle of conventional structure. Such a motorcycle, indicated generally at 12, typically comprises a front steerable wheel 14 and at least one rear wheel 16. The front wheel is rotatably supported on the front fork 18, having left and right fork members 20 and 22, and is steered by the handlebars 24 mounted on the fork and supported by the frame 25. A windshield 26 of known or convention structure, typically formed of a plastic such as LEXAN or LUCITE, is mounted on the handlebars. The windshield having a convex profile extends sufficiently above the handlebars so as to protect the rider's face and usually just below the handlebars. An engine 27 is mounted on the frame between the front and rear wheel and below the rider. The deflector of my invention comprises an essentially identical pair of first and second panels, indicated generally at 28 and 30, respectively, and are mounted on the motorcycle symmetrically with reference to the longitudinal central axis of the front fork, as explained in greater detail below. The symmetrical arrangement of the panel members is best seen in FIG. 1 illustrating one embodiment of the invention.

The panel members may be constructed of any suitable material such as metal (e.g., steel or aluminum), or plastic (e.g., LEXAN, LUCITE, acrylic, polyethylene, or polyvinyl chloride). As shown in FIG. 3, the panels are plastic and therefore transparent, and preferably are tinted or colored to be aesthetically more pleasing.

Referring now in particular to the embodiment illustrated in FIGS. 3–6, there is shown a first or upper panel 28 comprised of two integrally formed, substantially planar sections 32 and 34 angled obtusely relative to the horizontal plane. This obtuse angle between the two sections can vary depending on the construction of the motorcycle, but I have found that an angle ranging from about 95 to 135 degrees is usually satisfactory. Thus, the first panel 28 is comprised of an upper planar section 32 and a lower or bottom planar section 34, and as stated the panel is obliquely angled as viewed in elevational cross-section.

The first panel member desirably is fixedly mounted on the front fork 18 of the motorcycle with each panel mounted to a separate fork member thereby forming a symmetrical arrangement. The means for attaching or mounting the first panel to the fork is within the skill of the art, and may be accomplished by any suitable connecting means, which can vary depending upon the model of the motorcycle. For example, a suitable mounting means can be accomplished by providing the upper section 32 with a peripheral flange 36 extending transversely from the plane of section 32. One or more connecting rings 38, preferably two such rings, which are adjustable so as to accommodate a fork of varying diameters, are co-operably engagable with a fork member of the motorcycle, and the opposed ends of the rings are bolted as with bolts 40 or otherwise affixed to the flange 36. Alternatively, and where desired, the flange 36 may be provided with a concave profile (not shown) adapted to correspond to the contour of the fork member, and the connecting rings may be affixed at one end to the panel and then bolted to the flange. As a further alternative for affixing the first panel member to the fork, the flange may be as illustrated, and a plano-concave saddle (not shown), having a contour corresponding to contour of the fork, is interposed between the flange and the fork member having aligned apertures, and a connecting bolt attaches the panel to the fork.

It will be observed that when the first panel is mounted to the fork, the upper section is substantially parallel to the fork, as best shown in FIGS. 2 and 3. Because the bottom section 34 is obtusely angled relative to the plane of the upper section 32, when the first panel is mounted as described above, the bottom section thereby extends diagonally downwardly and rearwardly from the fork of the motorcycle. Where desired, the outwardly disposed marginal edge 42 of the upper section 32 is arcuate in order to provide clearance between the windshield 26 and the marginal edge 42 of the first panel when steering the motorcycle, and further eliminates a sharp corner, and also reduces the amount of material (e.g., metal or plastic) needed to fabricate the panel. The planar surface of the upper section and the downwardly extending planar surface of the bottom section direct the flow of air away from the rider.

The second panel or lower panel 30 comprises a substantially planar member having an inclined (angled or curved) upper surface 44, such as an arcuately curved upper surface thereby providing a convex profile at its upper surface. (See FIGS. 7–10.) This second panel is preferably mounted to the frame 25 by any suitable means. In a preferred embodiment of the invention, the panel 30 is provided at the peripheral edge with an upwardly extending, transverse flange 46 which also adds strength to the panel. The two oppositely disposed panel members 30 are preferably adjoined by interconnecting means 50, such as an elongated bracket affixed at opposite ends to each panel. This interconnection between the two panels gives a more sturdy mount and therefore the deflector is less susceptible to vibration and shock. The second panel 30 is then mounted to the fiame 26 of the motorcycle by any suitable interconnecting element such as bracket 48 affixed at one end to the flange 46 and at the opposite end to the frame, or to a boss (not shown) extending from the frame, as with bolts, rivets, or the like. The panel 30 is mounted for disposition mainly downwardly and rearwardly relative to the first panel 28 so that the planar surface of the second panel is substantially parallel with the plane of the bottom section of the first panel 28. It will be observed that by reason of this arrangement, and by reason of the angled or curved upper surface 44 of the second panel, there is sufficient clearance between the first and second panels when steering the motorcycle. That is, the first panel moves (rotates) with the steering, and if the second panel is not angled or curved, the first panel would hit the second panel. Thus, upon steering, the trailing edge of the bottom section of the first panel passes over and above the leading edge of the second panel, and this trailing edge remains substantially transverse to the longitudinal axis of the fork.

Further, the panels 28 and 30 are arranged in spaced overlapping disposition so that the angled or convex section 44 of the second panel is spaced forward of the lower or trailing edge of the bottom section of the first panel. Thus, the leading or forward edge of the second panel is positioned ahead of and at a higher level than the rearward or trailing edge of the first panel, and the rearward edge of the first panel is ahead of and at a higher level than the rearward edge of the second panel. This arrangement forms an air passageway for directing air downwardly and away from the rider's torso and head. The depending flange 46 helps to direct or channel the air against the motor and legs of the rider, thereby providing a cooling effect. In addition, it is advantageous that the surface area of the second panel is greater than the surface area of the first panel in that the second panel is capable of deflecting wind from the rider's legs, which is better in cold weather. That is, the larger second panel provides more shelter against the cold and rain.

Figure 12:
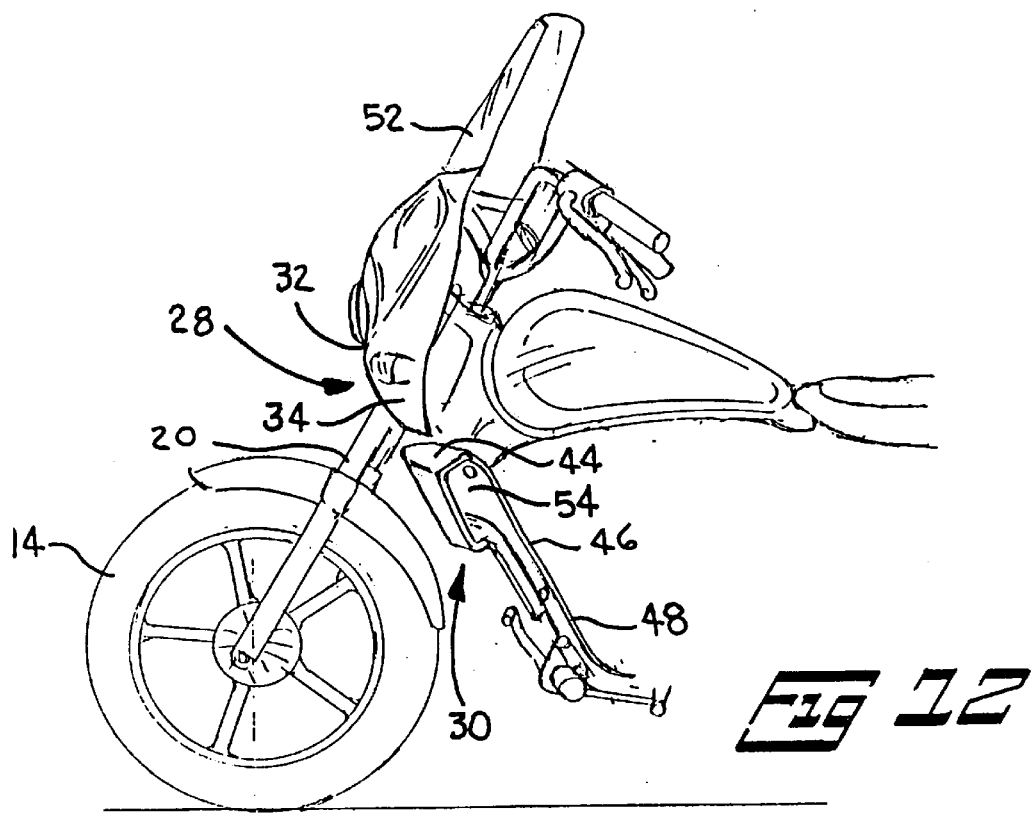
FIG. 12 is a side elevational view as viewed slightly from the rear of a motorcycle showing an alternative embodiment of the invention wherein the upper panel is formed integrally with the windshield.
Figure 15:
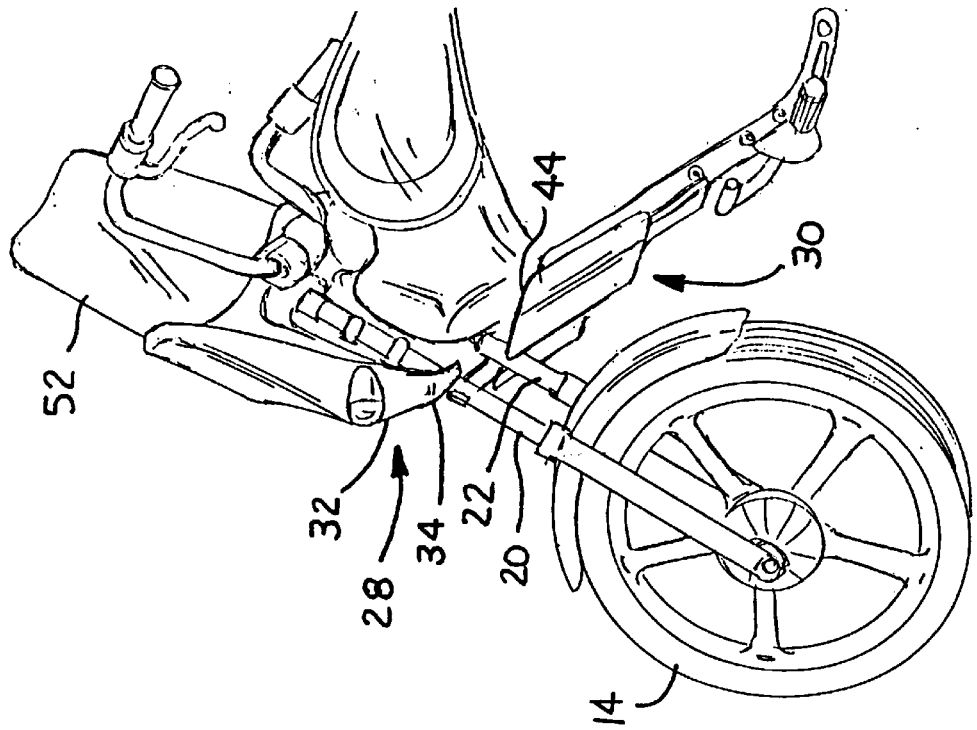
FIG. 15 is a side elevational view of the motorcycle of FIG. 12 showing the relative position of the deflector members when the motorcycle is steered to the right.
Figure 14:
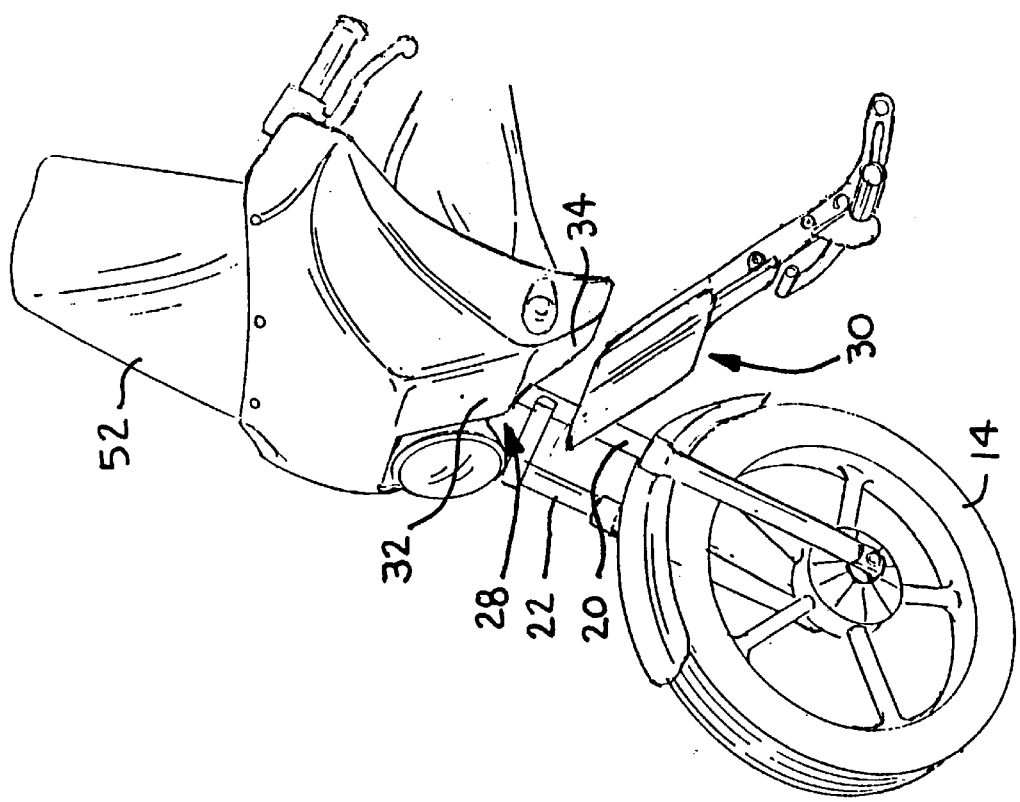
FIG. 14 is a side elevational view of the motorcycle of FIG. 12 showing the relative position of the deflector members when the motorcycle is steered to the left.

In the alternative embodiments shown in FIG. 11–15, the motorcycle 12 is provided with a windshield 52 positioned upwardly of the fork 18 and substantially parallel thereto. The first panel 28 is formed integrally with the windshield so as to depend downwardly therefrom on each side of the fork thereby forming a pair of deflector members. The upper section 32 of panel member 28 may be substantially parallel to the fork or angled slightly forward thereof, and the bottom section 34 of panel 28 is disposed obtusely relative to the plane of the first section, substantially as described above with reference to the other embodiment. Also, the second or bottom panel member 30 is formed and mounted to the motorcycle, substantially as described above. The relative positions of the panel members 28 and the 30 upon steering the bike is illustrated in FIGS. 14 and 15. It will be observed as viewed from one side of the motorcycle that when steering to the left (see FIG. 14), the trailing edge of section 34 of the top panel passes over and to the outside of the leading edge of upper surface 44 of the bottom panel; and upon steering to the right (see FIG. 15), the leading edge of section 34 passes over and to the inside of the leading edge of upper surface 44. The opposite relative positions would be true when viewing the bike from the opposite side.

Where desired, as shown in FIGS. 12, and in FIGS. 16 and 17 the second panel member 30 may be provided with a recess 54 having an upwardly inclined or arcuate top surface 56 and preferably an inclined lower surface 58. In accordance with this embodiment, the recess serves as a container or encasement for holding any relatively small items or paraphernalia of the rider.

It thus will be observed that the deflector of my invention provides numerous advantages and provides for comfort and safety for the rider. The deflector adds very little weight to the motorcycle, and its outer boundary lies wholly within the front profile of the cycle. Most significantly, the deflector substantially reduces air pressure against the driver, while providing a cooling effect to the motor and the legs of the driver. A deflector fabricated of tinted plastic is particularly aesthetic, which is further enhanced by the symmetry of the structure when mounted on the cycle. Further, it should be understood that the foregoing detailed description has been given for clearness of understanding only, and no unnecessary limtations should be understood therefrom, as modifications will be obvious to those skilled in the art.

What is claimed is:

1. A deflector for symmetrical mounting about the logitudinal axis of the front fork of a motorcyde and having handlebars operably connected to the fork, comprising:

(a) a pair of first panels, each member of the pair of said first panels for disposition on a side of the longitudinal center axis of the fork, substantially transverse to the longitudianal axis of the fork, and below the handlebars, said first panel having as an upper section and a bottom section obliquely angled thereto and both said upper section and said bottom section of substantially planar construction, said bottom section for despositon downwardly and rearwardly with reference to the longitudinal axis of the front fork, said bottom section having a trailing edge for desposition substantially transverse to the logitudinal axis of the front fork, and (b) a pair of second panels of substantially planar construction, each member of the pair of said second panels for disposition substantially trasverse to the longitudianal axis of the fork and mainly downwardly and rearwardly relative to said bottom section of said first panel, said second panel having a forwardly inclined upper surface in profile for spaced overlapping disposition with said bottom section of said first panel and having a leading edge for positioning forward of said trailing edge of said bottom section of said first panel.

2. A deflector according to claim 1 wherein said upper surface of said first panel is arcuately curved as viewed in elevational cross-section.

3. A deflector according to claim 1 or claim 2 further including means for attaching the first and second panels to the motorcycle.

4. A deflector according to claim 1 or claim 2 wherein said upper section includes a peripheral flange, and further includes means for attaching said flange to the fork of the motorcycle.

5. A deflector according to claim 4 wherein said means for attaching further includes an adjustable interconnecting element affixed to said peripheral flange and co-operably engagable with the fork of the motorcycle for mounting on the fork.

6. A deflector according to claim 1 or claim 2 wherein said bottom section includes a peripheral flange, and further includes means for attaching said flange to the motorcycle.

7. A deflector according to claim 1 or claim 2 further including means for interconnecting the second panels when mounted on the motorcycle.

8. A deflector according to claim 1 or claim 2 wherein said motorcycle includes a windshield positioned upwardly of the fork, and further includes means for connecting said first panel with the windshield.

9. A pair of deflectors for mounting on each side of a motorcycle having a front fork, each pair comprising:

(a) a first panel comprised of a substantially planar upper section and bottom section, said upper section having an outwardly disposed arcuate marginal edge; said bottom section obtusely angled relative to the plane of said upper section and having a trailing edge extending rearwardly of said upper section, for extending downwardly and rearwardly from the fork of the motorcycle;

(b) means for engaging said first panel with the fork; and (c) a substantially planar second panel for disposition mainly downwardly and rearwardly relative to said bottom section of said first panel, and having a forwardly inclined profile at its upper surface for overlapping disposition with said bottom section of said first panel and having a leading edge for positioning forward of said trailing edge of said bottom section of said first panel, and means for engaging said second panel with the motorcycle for substantially parallel disposition relative to the plane of said bottom section of said first panel.

10. A deflector according to claim 9 further including means for interconnecting the first panels of the pair when mounted on the motorcycle.

11. A deflector according to claim 10 wherein said first panels are formed in one piece with a windshield.

12. A pair of deflectors symmetrically mounted about a longitudinal center line of a motorcycle having a front fork having a longitudinal axis, and a windshield positioned mainly upwardly of the front fork and substantially parallel thereto, each pair comprising:

(a) a first panel disposed on each side of the longitudinal center axis and depending downwardly from the windshield, said first panel comprised of an upper section and a bottom section having a trailing edge disposed substantially transverse to the longitudinal axis of the front fork, said bottom section obliquely angled relative to the plane of said upper section for extending diagonally downwardly and rearwardly with reference to the front fork of the motorcycle; and (b) a second panel disposed substantially transverse to the longitudinal axis of the front fork and mainly downwardly and rearwardly relative to said bottom section of said first panel, and said second panel having a forwardly inclined profile at its upper surface for overlapping disposition with said bottom section of said first panel and having a leading edge positioned forward of said trailing edge of said bottom section of said first panel thereby forming an air passageway for directing air downwardly and away from the rider; and (c) means for fixedly mounting said second panel to the motorcycle for substantially parallel disposition relative to the plane of said bottom section of said first panel.

* * * * *